June 25, 1968 M. AVEN ET AL 3,390,311

SELENO-TELLURIDE P-N JUNCTION DEVICE UTILIZING DEEP TRAPPING STATES

Filed March 20, 1967 2 Sheets-Sheet 1

Inventors:
Manuel Aven,
Walter Garwacki,
by Edward D. Murphy
Their Attorney.

Inventors:
Manuel Aven,
Walter Garwacki,
by Edward D. Murphy
Their Attorney.

United States Patent Office 3,390,311
Patented June 25, 1968

3,390,311

SELENO-TELLURIDE P-N JUNCTION DEVICE UTILIZING DEEP TRAPPING STATES

Manuel Aven, Burnt Hills, and Walter Garwacki, Schenectady, N.Y., assignors to General Electric Company, a corporation of New York Continuation-in-part of applications Ser. No. 537,514 and Ser. No. 537,519, Mar. 25, 1966, which is a continuation-in-part of application Ser. No. 396,323, Sept. 14, 1964. This application Mar. 20, 1967, Ser. No. 624,384
6 Claims. (Cl. 317—237)

ABSTRACT OF THE DISCLOSURE

A bistable light emitting diode having high and low resistivity states is formed from a body of zinc seleno-telluride having a first region including deep hole traps and exhibiting N-type conductivity and a second region including deep electron traps and exhibiting P-type conductivity. When irradiated with short wavelength radiation, the traps are filled and the device exhibits a low resistivity and emits light. When irradiated with long wavelength radiation, the device exhibits high resistivity and does not emit light.

A wide band gap junction device comprising a semiconductive body of zinc seleno-telluride having P- and N-type regions. In a particular embodiment, the device is bistable and may be switched by the application of pulses of radiation.

The present invention is a continuation-in-part of the copending application of Manuel Aven, Ser. No. 537,519, filed Mar. 25, 1966 and of our copending application, Ser. No. 537,514, filed Mar. 25, 1966, which is in turn a continuation-in-part of our then copending application Ser. No. 396,323, filed Sept. 14, 1964, all now abandoned. All of these applications are assigned to the assignee of the present application. This invention relates to junction semiconductive devices and is more particularly directed to such devices comprising elements selected from Groups II*b* and VI*b* of the Periodic Table.

The semiconductive, photovoltaic and electroluminescent characteristics of devices comprising compounds selected from Groups II*b* and VI*b* of the Periodic Table are well known and have been the subject of much intensive study in recent years due to the expected advantages and corresponding wide utility of such devices. However, these advantages have not been fully realized and the various uses have not been developed, in part because of the relatively low efficiency presently obtainable and in part because of the scarcity of materials which can be fabricated with both N- and P-type conductivity. A particular failure has been the previous inability to obtain wide band gap light-emissive diodes composed of these materials.

Previous efforts with II*b*–VI*b* materials have produced only a few materials which can be made both N- and P-type and in most instances, at least one of the two types has been of such high resistivity at room temperature as to make its use impractical. Also, it has generally not been possible to fabricate P-N homo-junctions in these materials except in very narrow band gap systems. The widest band gap P-N junction device obtained to date is one which emits light in the very deep red area of the visible spectrum. Other attempts to achieve these objects have included hetero-junctions between different types of material, and these are suitable for some purposes. However, their efficiency is very low.

Accordingly, an object of the present invention is the provision of a semiconductive device comprising a novel II*b*–VI*b* material which can be produced with either N- or P-type conductivity.

Another object of the present invention is the provision of new and improved semiconductive, photovoltaic and electroluminescent junction devices comprising II*b*–VI*b* compounds which are substantially more efficient than previously known devices.

A further object of the present invention is the provision of a wide band gap electroluminescent diode comprising a single phase body of II*b*–VI*b* material.

Another object of the present invention is to provide wide band gap semiconductive devices that may exist in at least one of two stable, yet different, resistive and conductive states.

A more specific object of the present invention is to provide wide band gap semiconductive devices which may be changed from a high resistive state to a low resistive state by a pulse of a first wavelength radiation and may be returned to the high resistive state by a pulse of a second wavelength radiation.

Briefly, in accord with one embodiment of the present invention, we provide semiconductive devices comprising a monocrystalline body of zinc seleno-telluride having a pair of regions of different electrical characteristics. The zinc seleno-telluride comprises a composition in the form of $ZnSe_xTe_{1-x}$, wherein $x$ is approximately in the range of 0.1 to 0.7, but preferably approximately between 0.2 and 0.6. Each region may contain suitable conductivity-determining impurity additives to give the region desired P-type or N-type conductivity and producing an intermediate P-N junction region therebetween. The regions may also contain activators to yield photovoltaic, electroluminescent or other desirable semiconductive characteristics.

In accord with a specific embodiment, such a body is provided having a bulk or gross resistivity that is very high at the operating temperature, and a pair of non-rectifying electrical contacts to respective regions. Each of the separate regions of the body is provided with impurity states capable of trapping charge carriers of one conductivity type in one zone and of the opposite conductivity type in the other zone. Upon irradiation of the material with the first wavelength radiation, the respective entrapment in differing zones of the body causes the resistivity of the body to decrease substantially, permitting the conduction of current and recombination radiation resulting in the emission of visible light. The body may be returned to its original resistive state by application of a pulse of a second wavelength radiation.

The novel features believed characteristic of the present invention are set forth in the appended claims. The invention, itself, together with further objects and advantages thereof, may best be understood by reference to the following description, taken in connection with the appended drawings in which:

Figure 1:
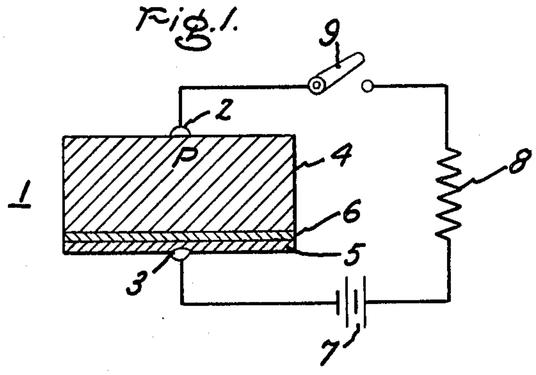
FIGURE 1 is a perspective view illustrating a semiconductive device constructed in accord with the present invention.

The device illustrated in FIGURE 1 comprises a monocrystalline body 1 of zinc seleno-telluride and a pair of electrodes 2 and 3 attached to opposed surface regions thereof. The body 1 comprises a compound of the formula $ZnSe_xTe_{1-x}$ wherein $x$ lies between 0.1 and 0.7 and is preferably approximately 0.4. The body is single phase;

that is, the Se and Te are distributed in even proportions throughout the crystal. The electrodes may comprise, for example, chemically deposited gold on a P-type region or fused-in indium on an N-type region. Other suitable electrodes may also be used.

The body comprises an electroluminescent diode and includes a P-type region 4, an N-type region 5 and a P–N junction region 6 therebetween. The P-type region may be prepared by doping it with $10^{17}$ atoms/cm.$^3$ of copper or silver or other suitable acceptors to give it P-type characteristics and the N-type region may be prepared by doping it with $10^{17}$ atoms/cm.$^3$ of aluminum or other suitable donors. Alternatively, since the crystals are grown are of P-type conductivity, apparently produced by holes ionized from a native shallow acceptor defect, believed to be a Zn vacancy, the P-type region 4 need not be intentionally doped. The diode may be a cube approximately 1 mm. on each side. The P-type and N-type layers conveniently are respectively approximately 0.9 mm. and 0.1 mm. thick and the P–N junction region is from 2 to 20 microns thick, for example. In the drawing, this region is disproportionately enlarged for clarity of illustration.

The diode is operated as an electroluminescent device by applying a predetermined voltage across the junction, for example, by means of the circuit shown in FIGURE 1 which includes a battery 7, a current-controlling resistor 8 and a switch 9. The diode is forward-biased, that is, the voltage applied to the respective regions corresponds in sign to the sign of the majority charge carriers in the region. Electrons are injected from the negative electrode into the N-type region and holes are produced in the P-type region. Upon reaching the P–N junction region, the electrons and holes combine with the resultant production of light. Due to the wide band gap of $ZnSe_xTe_{(1-x)}$ the light may be visible. To achieve such operation, the voltage applied to the active part of the diode may be approximately 3 volts at a current density of 1.0 amp./cm.$^2$.

The various devices of the present invention are all fabricated from homogeneous crystals of zinc selenotelluride wherein the selenium and tellurium are present in approximately equal proportions or up to approximately a 20 percent excess of either. Such crystals may be prepared by preparing a mixture of powdered zinc selenide and zinc telluride. Due to the higher volatility of ZnTe, the initial mix should contain a higher proportion of ZnSe as compared to ZnTe so that, during crystal preparation, the larger quantity of low volatility ZnSe compensates the smaller quantity of high volatility ZnTe and the amounts which volatilize and condense are in the desired ratio.

The mixture is prefired at a temperature of approximately 850° C. for approximately 2 hours in a hydrogen atmosphere and sintered in argon at 800° C. for approximately 1 hour. Crystals may be grown from the sintered mass in accord with the method described and claimed in U.S. Patent No. 3,243,267 of W. W. Piper, issued Mar. 29, 1966, the disclosure of which is incorported herein by reference. Briefly, this method comprises placing the mass in a quartz tube having a partially closed end and a crystallization end and heating the mass to its volatilization temperature while maintaining the partially sealed end below the condensation temperature so as to seal off the tube. The tube is then moved with respect to the temperature profile so that the crystallization end cools to the crystallization temperature, the material condenses and a crystal grows thereat. The tube is moved at such a rate that the crystal-vapor interface is always at the temperature at which the vapors just begin to condense.

It is noted that, due to the high volatility of ZnTe as compared to that of ZnSe, the feature, disclosed in the said Piper patent application, of back-subliming the sintered mass into a dense, partially crystallized boule by initially keeping the portion thereof adjacent the partially closed end below the crystallization temperature and crystallizing the initial vapors thereon while sealing the tube, should not be performed with the materials of the present invention since this may cause the separation of the ZnSe from the ZnTe. This step may be avoided by placing the tube in a temperature profile such that the entire sintered mass is held above the crystallization temperature while just the ends of the tube are at or below it. When vapors evolve, the tube is sealed off and crystallization of a single crystal begins without the back-sublimation which would occur if part of the mass is at or below the crystallization temperature.

The boules prepared by this method have been found to consist essentially of $ZnSe_xTe_{1-x}$ where $x$ ranges approximately between 0.1 and 0.7, depending on the exact ratio of the initial mixture.

Further improvement is obtained by taking the polycrystalline boule so formed, reinserting into the reaction vessel of the Piper apparatus and locating a seed crystal of ZnSe at the condensation or closed tube end, and inserting the tube into a preselected temperature gradient, to cause volatilization of the polycrystalline boule and condensation growth of a monocrystalline ingot having a more uniform and homogeneous crystal structure.

The crystals as prepared are of P-type conductivity, either because of acceptor impurities in the crystal or because of the previously mentioned shallow zinc vacancy defect. For simple diodes, that is, for diodes which function in a normal manner and not as those described in conjunction with FIGURES 2–4 of this specification, the room temperature resistivity of the crystal should be in the range of 1 ohm-cm. to $10^4$ ohm-cm. It is preferred that the composition be such that $x$ is in the range of 0.2 to 0.6 since beyond these limits it becomes more difficult to impurity-activate the crystals to the desired conductivity type and their room temperature resistivity may become undesirably high.

The crystals may be made more strongly P-type at room temperature by the addition of a P-type conductivity-determining impurity, that is, a shallow acceptor, such as copper in a concentration in the range of $10^{17}$ to $10^{18}$ atoms/cm.$^3$ as a doping material, for example by diffusion. Other shallow acceptors include arsenic, antimony, phosphorus and silver. It has further been found that the addition, for example, by the method disclosed in U.S. Patent No. 3,146,204, M. Aven, issued Aug. 25, 1964, of an N-type conductivity-determining impurity, or shallow donor, such as aluminum in concentrations in the range of $10^{17}$ to $10^{19}$ converts the crystals to N-type material having a room temperature resistivity of, for example, in the range of 1 ohm-cm. to $10^5$ ohm-cm. The resistivity in some cases may be as low as 0.3 ohm-cm. In general, the maximum doping range for either N- or P-type conductivity regions currently necessary for most uses of simple diodes is from $5\times10^{16}$ to $5\times10^{19}$ atoms/cm.$^3$. Greater or smaller quantities may also be satisfactory in particular cases. The crystals, in either conductivity type, are strain sensitive, thermosensitive and, with suitable additional activation, photovoltaic and electroluminescent. For example, activators such as copper and manganese may be added in approximate concentrations of from $5\times10^{16}$ to $5\times10^{19}$ atoms/cm.$^3$ to provide photovoltaic and electroluminescent properties. Other suitable donors, acceptors and activators may also be used.

Fabrication of diodes from this material may be accomplished by preparing a P-type crystal, diffusing aluminum donors a predetermined depth into the crystal one surface thereof to convert a portion to N-type. The diode may be prepared with characteristics suitable for rectification, electroluminescence, laser action or other uses. A pair of nonrectifying electrodes are connected to the respective regions. Such contacts to the N-type material may be made with indium, gallium, or alloys thereof. Contacts to the P-type region may be of gold, silver or lead.

A particular advantage of such diodes is the wide band gap between the conduction and valence bands in the junction region. This results in the production of high energy photons upon electron-hole recombination at the junction and the light output may, therefore, be well within the visible spectrum. Specifically, the band gap is approximately in the range of 2.1 to 2.3 electron volts and the wavelength of the corresponding light emitted is principally in the range of 5600–6300 A.

It is also noted that an asymmetrically conducting device, for rectifying purposes, may be fabricated by making one rectifying and one non-rectifying contact to a single conductivity type body. For example, a crystal of zinc seleno-telluride of either N- or P-type may be provided and by attaching a chemically deposited gold electrode to one side and a fused-in indium electrode to the other, a rectifying device is achieved. Regardless of the type of conductivity, one electrode of the two then makes a rectifying contact to the device while the other contact is non-rectifying. Specifically, the gold contact is rectifying when deposited on an N-type body and the indium contact is rectifying when fused to a P-type body. For low temperature environments, it is preferred that the non-rectifying contact to the P-type body be the multiregion contact described and claimed in the copending application of W. Garwacki, Ser. No. 616,366, filed Feb. 15, 1967.

Figure 2:
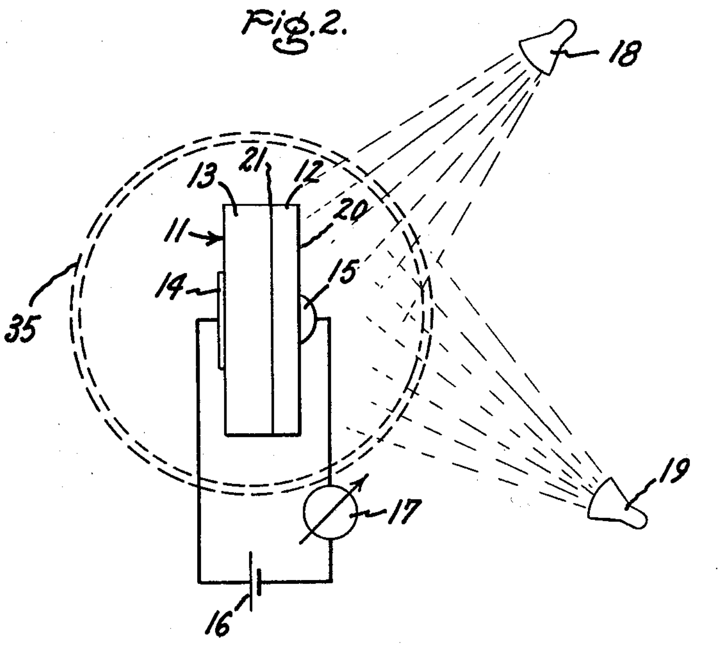
FIGURE 2 illustrates a semiconductive device constructed in accord with another embodiment of the present invention, together with an appropriate energizing circuit, and activation and deactivation means therefor.

FIGURE 2 represents a specific embodiment of this invention wherein a diode, although constructed in accord with the above description, exhibits unique and particularly useful properties. In FIGURE 2 a semiconductor diode is comprised of a monocrystalline body 11 of a broad band gap semiconductive material and includes a first region 12 having a first electrical conductivity characteristic and a second region 13 having a second electrical conductivity characteristic. A pair of non-rectifying electrodes 14 and 15 are in substantially ohmic contact with regions 12 and 13 respectively. For operation as a bistable semiconductor element, semiconductor device 11 is subjected to an electrical bias potential applied, for example, by a suitable source of potential, represented schematically by battery 16, and current therethrough is indicated by an ammeter 17 as an indication of its ability to act as an insulator or a conductor. A first source of radiant energy for irradiating semiconductive device 11 to cause it to change from a first conductivity state to a second conductivity state is represented generally by light source 18 and a second source of radiant energy suitable for irradiating semiconductor device 11 to return it from a second conductivity state is represented by light source 19. As used herein the term "light" is not limited to visible light but includes infrared and ultraviolet radiation, for example, as well.

As is mentioned hereinbefore the principles underlying the operation of the devices of the present invention may be utilized in conjunction with devices fabricated of zinc seleno-telluride since the band gap of this material is, uniquely, very wide. The wide band gap is necessary, so that the stimulation of band-to-band, band-to-impurity level or inter-impurity level emission therein may have a wavelength within the visible spectrum. This requires a band gap energy of at least 1.8 electron volts (ev.) to be utilized in the practice of the present invention.

Assuming semiconductor device 11 of FIGURE 2 to be from the zinc seleno-telluride material described by the chemical formula $ZnSe_xTe_{1-x}$ in which $x$ may vary from 0.1 to 0.7 and may for example be approximately 0.36, the resistivity of the device at operating temperature when in the high resistivity state is selected to be in excess of $10^{10}$ ohm centimeter. More specifically for this specific compound at 80° K. (the optimum operating temperature of this particular system) the resistivity of device 11 from electrode 14 to electrode 15 may be expected to be within the range of $10^{14}$ to $10^{17}$ ohm centimeters with about 10 to 20 v. potential applied to the device. Such a device as monocrystalline body 11 may be formed substantially in accord with the process set forth above except for the fact that no attempt is made to add conductivity modulating impurities to the body while in preparation. The same precautions are taken to ensure high crystal perfection and freedom from undesired contaminants as set forth above and, additionally, no additives are directly incorporated within the body. Wide band gap semiconductive devices of the zinc seleno-telluride system when so formed usually have a high operating-temperature unirradiated resistivity in excess of $10^{10}$ ohms centimeters.

The as-grown and cut wafer of zinc seleno-telluride, modified by firing in contact with gaseous or liquid zinc as specified below, is utilized to form zone 13 of semiconductive wafer 11. Zone 13, having a high operating temperature resistivity, is found to be very weakly P-type and has a concentration of the order of $10^{15}$ to $10^{18}$ deep lying sites per cc. within the crystal lattice structure thereof, the function of which will be explained below. The high resistivity P-type characteristics thereof are evidence of unbound carriers in the range of approximately 10 to $10^7$ carrier per cubic centimeter at the operating temperature, i.e. 80° K., as compared with the low resistivity impurity impregnated substance as is set forth in the case of simple diodes previously described and has in its operating temperature range a concentration of free conduction carrier within the range of $10^{13}$ to $10^{18}$ per cubic centimeter corresponding to a resistivity of 1 to $10^5$ ohm centimeters.

While the exact nature of the deep lying sites present in the finished semiconductive device in zone 13 may not presently be described with exactitude, it may be analogous to the VX center, which is a double acceptor site and which has been described in the zinc cadmium-sulpho-selenide system and is reported in a paper by H. H. Woodbury and M. Aven at page 197 of "Radiation Damage in Semiconductors" published at Paris by Dunod Publishing Co., 1965.

The deep lying site in the P-type material of the present invention is characterized as having a high capture cross-section for electrons and, after filling of traps therein by the capture of electrons, a low capture cross-section for positive holes. This site is known as a deep trap. As used herein a deep trap may be defined as one which is at least approximately $50kT$ in electron volts from the band edge from which free carriers are trapped. (I.e. in P-type material a deep trap would be at least this distance measured in electron volts from the conduction band) where $k$ is the Boltzmann constant and T is the operating temperature.

Region 12 of semiconductor crystal 11 is one which has the characteristics of the original wafer as in region 13 and is formed therefrom by a diffusion, for example, from surface 20 of a material having activator impurity characteristics which incidentally may make the body weakly N-type at the operating temperature but the primary object of which is to cause the introduction into region 12 of deep hole trapping sites similar to the VX centers referred to hereinbefore. Such centers may be induced by the thermal diffusion to the desired depth (which is not critical since the bulk material is transparent to radiation) of a total concentration of activator impurity atoms such as the element of Group III of the Periodic Table, aluminum, in the range of from approximately $10^{17}$ to $10^{19}$ atoms per cubic centimeter.

The diffusion may be accomplished by immersing the semiconductor crystal in an alloy of zinc and the activator impurity, for example, aluminum and heating until the impurity has diffused to the desired depth, followed by the removal (by grinding or etching) of the diffused layer from all but one side of the rectangular-shaped wafer. Alternately, the impurity may be diffused in first, followed by a firing in Zn vapor. In one instance a wafer of $ZnSe_xTe_{(1-x)}$ where $x$=.4 was immersed in a bath of 99.9 mol percent Zn and 0.1 mol percent Al at a temperature of 950° C. for 16 hours. The diffusion depth was about .1 mm. on a wafer of 2 mm. x 2 mm. x 1 mm. dimension. At the operating temperature of the devices constructed in accord with the present invention, this total impregnation results in a region which may be weakly N-type and may have a concentration within the range of $10^{15}$ to $10^{18}$ trapping sites per cubic centimeter and a free electron concentration of the magnitude of 10 to $10^7$ per cc. at the operating temperature. This carrier concentration and impurity center concentration is comparable to an operating-temperature resistivity in the unirradiated state of in excess of $10^{10}$ ohm centimeters. In the zinc seleno-telluride system where $x$ is between 0.1 to 0.7 this corresponds to an unirradiated operating-temperature resistivity of approximately $10^{14}$ to $10^{17}$ ohm centimeters. The trapping site established by this impurity diffusion is deep in nature as is defined hereinbefore and has a high capture cross-section for positive holes and, subsequent to the complete filling of the traps with holes, has a very low capture cross-section for electrons. Thus, the sites are the inverse analogs of the deep donor trapping sites in region 13 of wafer 11.

The interface 21 between regions 13 and 12 may be denominated as a "pseudo P-N junction." Thus, for example, at operating temperatures, as for example, in the zinc seleno-telluride system at 80° K. with the material in the stable high resistivity state, there may be substantially no difference in the electrical conduction characteristics of the two regions, both of which will be of a resistivity in excess of $10^{10}$ ohm centimeters, and essentially insulators. Due, however, to electron trapping sites on the region 13 and hole trapping sites in region 12, upon irradiation with a suitable wavelength, region 12 becomes low resistivity "pseudo-N-type" and region 13 becomes low resistivity "pseudo-P-type" thus creating an "effective" P-N junction.

Normally a region is considered to be an N-type semiconductor region when there is an excess of uncompensated electrons therein and conduction of current is by the motion of these electrons. Similarly a semiconductive region is considered to be P-type when there is an excess of uncompensated positive holes and conduction of electric current is by the motion of the excess positive holes.

The juxtaposition of an N-type and a P-type region as described hereinbefore gives rise to a P-N junction which has rectifying characteristics and other characteristics which may vary as a function of temperature, but which in general, may be said to exist under most conditions. Such a junction does not exist in devices in accord with the present invention. In accord with the present invention, neither side under unirradiated conditions is necessarily P-type or N-type, rather they have the latent capability of freeing electrons or holes for conduction of electric current.

Figures 3A, 3B, 3C, 3D:
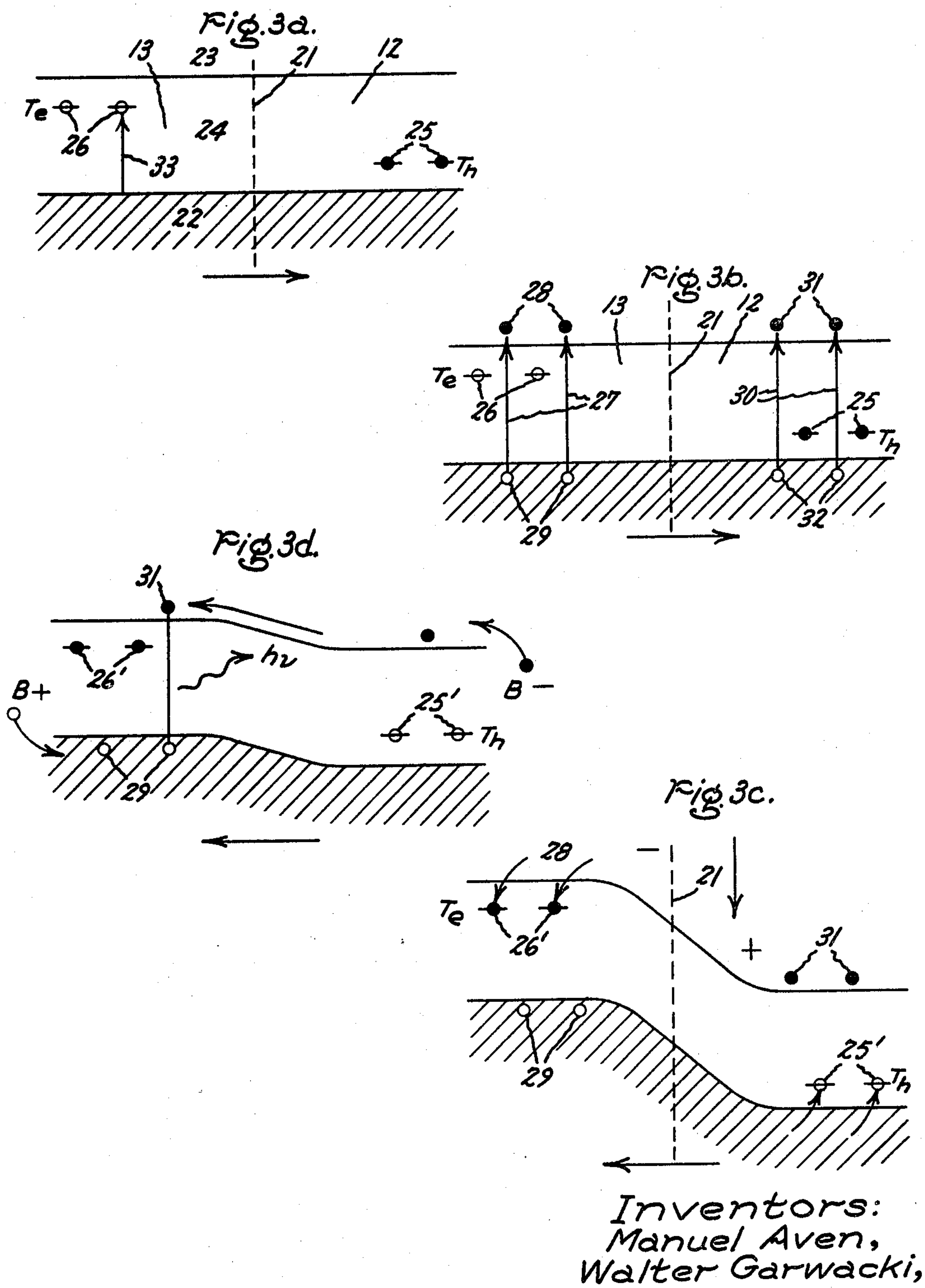
FIGURE 3 illustrates, in conventional energy level diagram form, the mechanism by which the operation of the devices of FIGURE 2 is achieved.

For an understanding of the functioning of the device in accord with the present invention reference is herein made to FIGURES 3A, 3B, 3C and 3D respectively which sequentially indicate the operation of the devices as illustrated in FIGURE 2 of the drawing. All figures include the valence band 22, the conduction band 23 and the forbidden band or band gap 24. In FIGURE 3A region 12 has the energy band structure illustrated to the right of the dotted line whereas region 13 has the band structure represented to the left of the dotted line. In region 12 a concentration of deep lying hole traps 25 having a high capture cross-section for positive holes exists and in region 13 a concentration of deep lying electron traps 26 having a high capture cross-section for electrons exists. In the unirradiated state, however, all traps are empty and there are very few free conduction carriers available for the conduction of electricity. The resistivity of the device is, therefore, extremely high and the conductivity extremely low. In FIGURE 3B the same band structure is illustrated after or during the irradiation of the device with radiation sufficient to cause activation of the material but before the activating process is completed. In FIGURE 3B, the arrows 27 represent the absorption of a pair of photons of energy equal or higher in energy to the band gap energy to raise a pair of electrons 28 from the valence band 22 to the conduction band 23 leaving a pair of positive holes 29 remaining in the valence band. Similarly in region 12 on the other side of the "pseudo junction" 21 a pair of arrows 30 represent the absorption of a photon of energy equal or greater in value to the band gap energy raising a pair of conduction electrons 31 from the valence band 22 to the conduction band 23 with the creation of a pair of positive holes 32 remaining in the valence band 22.

In FIGURE 3C of the drawing the activation process has been completed. Electrons 28 have been entrapped in traps 26 now referred to as 26' because they are filled traps. This leaves positive holes 29 free in the valence band for the conduction of current, and similarly holes 32 have been entrapped in hole traps 25 now identified as 25' because they are filled, leaving conduction electrons 31 in the conduction band free for the conduction of electric current. Thus although there were initially no hole or electron concentrations of significance prior to activation a "pseudo junction" 21 now exists and is properly identified by an appropriate adjustment of the energy band system to indicate the availability of conduction electrons for current flow in the conduction band and positive holes available for current in the valence band.

In FIGURE 3D of the drawing there is illustrated the process by which light of visible wavelength is emitted from the junction. This process is brought about by applying a potential difference, e.g. by means of a battery, to the device, with the negative terminal connected to the N-type side of the device, and the positive terminal to the P-type side. As a consequence of the applied potential, a conduction electron in the conduction band comes into proximity with a conduction hole in the valence band and according to the statistical probability of the occurrence, a recombination of the free hole and free electron occurs with the destruction of both. The change in the "bending" of the band structure is due to the applied potential. Actually, once the devices in accord with the present invention are so activated as to cause the creation of free conduction carriers, the process is self-regenerative. Thus, for example, the photon $h\nu$ which is emitted by the recombination of electron 31 with hole 29 to cause the extinction of both may be used to refill one of the traps which may have lost a trapped charge carrier.

Thus, by the foregoing, it has been demonstrated that according to the mechanism of deep trapping levels in a normally highly resistive semiconductor material, wavelength excitation of the proper energy may cause the creation of a "pseudo P-N junction" and may render the material highly conductive.

Just as the rendering of the non-conducting highly resistive semiconductive body as illustrated in the band structure of FIGURE 3A has been rendered highly conductive as in FIGURE 3C, the process may be reversed by imparting to the semiconductive body radiant energy having an energy (in electron volts) sufficient to empty electron traps 26' or hole traps 25' and thus return the device to the energy state as represented by FIGURE 3A. In general, the energies for switching the device of the present invention from a high resistive state to a low resistive state and from a low resistive state to a high resistive state are as follows:

The radiation for exciting the high resistivity material to the low resistivity state must be visible or short wavelength radiation having, as a first approximation, a photon energy in electron volts which is greater than the energy represented by the energy of the band gap than the energy represented by the energy of the band gap less the energy distance between the deep trap and the nearest band edge. Thus, for example, in FIGURE 3 of the drawing, it must be of an energy equal to or greater than the line represented by arrow 33 which is the distance between the electron traps in the P-type region and the valence band.

In actual practice, it is usually found that the position of the trapping level experiences a slight change in position (called the Stokes shift) depending on whether it is occupied by an electron or a hole. Therefore the exciting light usually has to be about 0.2 to 0.5 ev. greater than the energy represented by the energy of the band gap less the energy distance between the deep trap and the nearest band edge. The energy for de-excitation from the low resistive state to the high resistive state is represented by radiant energy of long wavelength having a minimum energy corresponding to the trap depth represented by the energy of the band gap less the energy of the trap depth (modified by the 0.2 to 0.5 ev. Stokes shift), or the energy necessary to empty all traps. As specific examples of these values, for a zinc seleno-telluride of the formula $ZnSe_xTe_{1-x}$ where $x$ equals .36, the device as illustrated in FIGURE 2 of the drawing may be caused to go from the high resistivity state to the low resistivity state by irradiation with long wavelong radiation having an energy $h\nu$ equal to or greater than two electron volts. Similarly the same substance may be caused to return back to the high resistive state when irradiated by infrared radiation having a wavelength corresponding to an energy of from 1.98 to 0.57 electron volts. It is noted that the diode may be switched from the state of FIGURE 3A to that of FIGURE 3B by the application of an excess forward voltage of the order of 50 volts.

Thus from the foregoing it is apparent that besides being able to function as sources of visible light a number of additional utilities are readily apparent from devices in accord with FIGURE 2 of the present invention. The device may be utilized as a memory or information storage device since the time decay is negligible. Similarly it may be used as a triggered bistable device which may, in the sense of a conventional switch or circuit breaker be caused to switch from a conductive to a nonconductive state and back by irradiation with differing wavelengths. Various long and short wavelength detectors are also specific applications of the invention. While, in some instances, it may be necessary to enclose the device in an opaque vessel to preclude transient radiation from effecting the conductive state in an undesired manner, and it may also be necessary to cool the devices to varying temperatures, as for example, with the zinc seleno-telluride system to a temperature of approximately 80° K., in order to cause the bistable operation, these expedients are well within the skill of those well versed in the art. More specifically a thermal vessel, as for example, a Dewar flask, represented schematically by circles 35 in FIGURE 2 of the drawing may be used to surround the semiconductive device 11 and may be filled with an appropriate thermal fluid, as for example liquid nitrogen.

By the foregoing certain embodiments of the invention have been disclosed. Other modifications and changes may readily occur to those skilled in the art. Accordingly by the appended claims we intend to cover all such modifications and changes as fall within the true spirit of the foregoing invention.

What we claim as new and desire to secure by Letters Patent of the United States is:

1. A bistable light-emitting semiconductive device having two stable resistivity values and comprising:

(a) a monocrystalline semiconductive body of zinc seleno-telluride material having the formula $$ZnSe_xTe_{(1-x)}$$

and having a first region containing a concentration of deep-lying hole traps and exhibiting N-type conductivity and a second region in contact with said first region and having a concentration of deep-lying electron traps and exhibiting P-type conductivity;

($a_1$) said material including means for producing a low-operating temperature resistivity state of said device upon irradition of said body with short wavelength radiation to fill said traps; and ($a_2$) said means producing a high-operating temperature resistivity state of said device upon irradiation of said body with long wavelength radiation to empty said traps.

2. The device of claim 1 where $x$ varies from 0.1 to 0.7.

3. The device of claim 1 wherein the high resistivity level is at least $10^{10}$ ohm centimeters, and the low-resistivity level is from about 10 to $10^5$ ohm centimeters.

4. The device of claim 1 wherein the operating temperature is of the order of 80° K.

5. The device of claim 4 wherein the greater portion of the surface thereof is exposed for allowing radiant emission when in the low-resistivity state.

6. The device of claim 1 wherein the first short wavelength has a wavelength corresponding to an energy value of at least 2 ev. and the second long wavelength radiation has a wavelength corresponding to an energy value of approximately 0.57 to 1.98 ev.

References Cited

UNITED STATES PATENTS

| | | | |
|---|---|---|---|
| 2,978,417 | 4/1961 | Larach | 317—235 |
| 3,104,229 | 9/1963 | Koelmans et al. | 317—235 |
| 3,218,203 | 11/1965 | Ruehrwein | 317—235 |
| 3,218,204 | 11/1965 | Ruehrwein | 317—235 |

JAMES D. KALLAM, *Primary Examiner.*